United States Patent
Qiu et al.

(10) Patent No.: US 12,040,672 B2
(45) Date of Patent: Jul. 16, 2024

(54) AIR CONDITIONER, COMPRESSOR AND MOTOR WITH STATOR CORE HAVING SPECIFIC DIMENSIONS

(71) Applicant: GUANGDONG MEIZHI COMPRESSOR CO., LTD., Guangdong (CN)

(72) Inventors: Xiaohua Qiu, Guangdong (CN); Dong Xiang, Guangdong (CN); Zunmu Zhang, Guangdong (CN); Dejin Zhang, Guangdong (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 716 days.

(21) Appl. No.: 17/126,610

(22) Filed: Dec. 18, 2020

(65) Prior Publication Data
US 2021/0104930 A1  Apr. 8, 2021

Related U.S. Application Data
(63) Continuation of application No. PCT/CN2019/097980, filed on Jul. 26, 2019.

(30) Foreign Application Priority Data
Jul. 27, 2018 (CN) ......................... 201810842688.6
Jul. 27, 2018 (CN) ......................... 201821215702.1

(51) Int. Cl.
*H02K 3/28* (2006.01)
*F25B 49/02* (2006.01)
*H02K 1/14* (2006.01)

(52) U.S. Cl.
CPC ............ *H02K 3/28* (2013.01); *F25B 49/025* (2013.01); *F25B 49/027* (2013.01); *H02K 1/14* (2013.01); *H02K 2213/03* (2013.01)

(58) Field of Classification Search
CPC .. H02K 1/14; H02K 1/10; H02K 1/08; H02K 1/12; H02K 1/141; H02K 1/143;
(Continued)

(56) References Cited

U.S. PATENT DOCUMENTS

| | | | |
|---|---|---|---|
| 7,709,992 B2 * | 5/2010 | Hussey | H02K 3/02 310/216.071 |
| 7,868,509 B2 * | 1/2011 | Yoshino | H02K 1/16 310/216.131 |

(Continued)

FOREIGN PATENT DOCUMENTS

| | | |
|---|---|---|
| CN | 1947320 A | 4/2007 |
| CN | 202931152 U | 5/2013 |

(Continued)

OTHER PUBLICATIONS

International Search Report dated Sep. 20, 2019 received in International Application No. PCT/CN2019/097980 together with an English language translation.

(Continued)

*Primary Examiner* — Maged M Almawri
(74) *Attorney, Agent, or Firm* — SCULLY SCOTT MURPHY & PRESSER, PC

(57) ABSTRACT

A motor for a rotary compressor, and a compressor and an air conditioner having the motor, are disclosed. The motor includes a stator core and a rotor core. The stator core has a through-hole in a center thereof. The stator core is provided with a plurality of circumferentially spaced stator teeth, and the number of stator teeth is M. The rotor core is rotatably disposed in the through-hole. The rotor core is provided with a plurality of circumferentially spaced rotor slots, and the number of the rotor slots is N, wherein 2≤N−M≤6. A cross-sectional area of the stator core is denoted as S, and a distance between two endpoints of two radially opposite (Continued)

curved segments of an outer edge of the cross section is denoted as L, wherein $0.93 \leq (4*S)/(3.14*L^2) \leq 0.96$.

10 Claims, 2 Drawing Sheets

(58) Field of Classification Search
CPC .......... H02K 1/146; H02K 1/148; H02K 1/16; H02K 2213/03; H02K 3/28
See application file for complete search history.

(56) References Cited

U.S. PATENT DOCUMENTS

| | | | | |
|---|---|---|---|---|
| 8,222,788 | B2* | 7/2012 | Rose | F04C 29/0085 |
| | | | | 310/195 |
| 8,390,167 | B2* | 3/2013 | Jung | H02K 1/165 |
| | | | | 310/216.069 |
| 8,450,901 | B2* | 5/2013 | Jung | H02K 3/50 |
| | | | | 310/71 |
| 9,831,727 | B2* | 11/2017 | Brahmavar | H02K 15/00 |
| 10,938,257 | B2* | 3/2021 | Xiang | H02K 1/16 |
| 2007/0216253 | A1* | 9/2007 | Shendi | H02K 1/165 |
| | | | | 310/180 |
| 2012/0082573 | A1* | 4/2012 | Fargo | H02K 21/46 |
| | | | | 29/596 |
| 2012/0159983 | A1* | 6/2012 | Tsutsumi | F25B 31/026 |
| | | | | 310/211 |
| 2014/0154115 | A1* | 6/2014 | Bingaman | F04C 18/0215 |
| | | | | 417/410.5 |
| 2015/0010412 | A1* | 1/2015 | Liu | H02K 3/28 |
| | | | | 310/198 |
| 2017/0045268 | A1* | 2/2017 | Fujisue | H02K 3/02 |
| 2022/0069686 | A1* | 3/2022 | Mohol | H02K 17/04 |

FOREIGN PATENT DOCUMENTS

| | | | |
|---|---|---|---|
| CN | 106487121 A | * | 3/2017 |
| CN | 106487121 A | | 3/2017 |
| CN | 207410126 U | | 5/2018 |
| CN | 208581094 U | | 3/2019 |
| KR | 20090063450 A | | 6/2009 |
| KR | 20090080197 A | | 7/2009 |

OTHER PUBLICATIONS

Examination Report dated Jun. 30, 2021 received in Indian Patent Application No. IN 202127004265 together with an English language translation.

* cited by examiner

AIR CONDITIONER, COMPRESSOR AND MOTOR WITH STATOR CORE HAVING SPECIFIC DIMENSIONS

CROSS-REFERENCE TO RELATED APPLICATIONS

The present application is a continuation application of PCT International Application No. PCT/CN2019/097980, filed on Jul. 26, 2019, which claims priority to Chinese Patent Application Serial No. 201810842688.6 and No. 201821215702.1, both filed with China National Intellectual Property Administration on Jul. 27, 2018, the entire contents of which are incorporated herein by reference for all purposes. No new matter has been introduced.

FIELD

The present disclosure relates to the field of motors, and more particularly to a motor for a rotary compressor, and an air conditioner and a compressor having the motor.

BACKGROUND

At present, when air conditioners achieve the same working effect, how to reduce energy consumption of air conditioners has always been a focus of research. For example, motors of compressors for air conditioners need to have higher efficiency. To improve the efficiency of the motors, there are generally two schemes in the related art. As a first scheme, a sinusoidal permanent magnet synchronous motor instead of a single-phase induction motor is adopted, but the sinusoidal permanent magnet synchronous motor needs to be powered by a corresponding frequency converter, which makes the cost high. At the same time, the frequency converter itself has losses, consumes energy, and increases the use of the components. As a second scheme, new materials are used to reduce losses, for example, the use of copper with lower resistivity as a replacement for aluminum. However, the cost of cooper is significantly higher than that of aluminum, and copper has a high melting point and needs special treatment in a die-casting process, which is complex and increases the defect rate.

SUMMARY

The present disclosure aims to overcome at least one of the technical problems in the related art. Therefore, an objective of the present disclosure is to provide a motor for a rotary compressor, which has high efficiency and low energy consumption.

The present disclosure also provides a rotary compressor with the above motor.

The present disclosure also provides an air conditioner with the above rotary compressor.

A motor for a rotary compressor according to embodiments of a first aspect of the present disclosure includes: a stator core having a through-hole in a center of the stator core, and provided with a plurality of stator teeth spaced apart from each other along a peripheral direction, the number of the stator teeth being M; a rotor core rotatably arranged in the through-hole, and provided with a plurality of rotor slots spaced apart from each other along the peripheral direction, the number of the rotor slots being N, in which $2 \le N-M \le 6$. An area of a cross section of the stator core is S, and a distance between corresponding two endpoints of two curved segments disposed oppositely is L, in which $0.93 \le (4*S)/(3.14/L^2) \le 0.96$.

For the motor according to the embodiments of the present disclosure, by limiting the number of stator teeth of the stator core of motor, and the relationship between the number of stator teeth and the number of rotor slots of the rotor core, under the fixed area ratio of the core, and on the premise of ensuring the performance of the motor, the efficiency of the motor can be improved, the loss of the motor can be reduced, and at the same time the electric energy loss can be reduced.

According to an embodiment of the present disclosure, the number M of the stator teeth is twenty-eight.

According to an embodiment of the present disclosure, a cross section of the through-hole is circular, and an outer peripheral edge of the stator core includes straight segments arranged oppositely and curved segments arranged oppositely.

According to an optional embodiment of the present disclosure, the curved segments are connected between two adjacent straight segments, and the curved segments and the straight segments are sequentially connected end-to-end to form a closed shape.

According to another optional embodiment of the present disclosure, a diameter of the through-hole is D, and a distance between corresponding two endpoints of the two curved segments arranged oppositely is L, in which $D/L \ge 0.52$.

According to another embodiment of the present disclosure, an iron loss value of the stator core and an iron loss value of the rotor core are $P1_{15/50}$ and $P2_{15/50}$ respectively, and $P1_{15/50}$ and $P2_{15/50}$ each refer to an iron loss value per unit weight with a frequency of 50 Hz and a peak value of sinusoidal magnetic induction of 1.5T, wherein $P1_{15/50} \le 10$ W/kg, and $P2_{15/50} \le 10$ W/kg.

According to another embodiment of the present disclosure, the stator core includes a plurality of stacked stator punching sheets, the rotor core includes a plurality of stacked rotor punching sheets, and a thickness of each stator punching sheet and a thickness of each rotor punching sheet are $h_1$ and $h_2$ respectively, wherein $0.35 \text{ mm} \le h_1 \le 0.65 \text{ mm}$, and $0.35 \text{ mm} \le h_2 \le 0.65 \text{ mm}$.

Furthermore, a magnetic induction value of the stator punching sheet is $B_1$, and a magnetic induction value of the rotor punching sheet is $B_2$, wherein $B_1 \ge 1.7T$, and $B_2 \ge 1.7T$.

A compressor according to embodiments of a second aspect of the present disclosure includes the motor according to the above embodiments.

For the compressor according to the embodiments of the present disclosure, by limiting the number of the stator teeth of the stator core of the motor, and the relationship between the number of the stator teeth and the number of the rotor slots of the rotor core, under the fixed area ratio of the core, and on the premise of ensuring the performance of the motor, the efficiency of the motor can be improved, the loss of the motor can be reduced, and at the same time the electric energy loss can be reduced, and the performance of the compressor can be improved.

An air conditioner according to embodiments of a third aspect of the present disclosure includes the compressor according to the above embodiments.

For the air conditioner according to the embodiments of the present disclosure, by limiting the number of the stator teeth of the stator core of the motor, and the relationship between the number of the stator teeth and the number of the rotor slots of the rotor core, under the fixed area ratio of the core, and on the premise of ensuring the performance of the motor, the efficiency of the motor can be improved, the loss of the motor can be reduced, at the same time the energy loss can be reduced, the performance of the compressor can be enhanced, the energy consumption of the air conditioner can be reduced, and the cost can be lowered.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of the present disclosure will become apparent and more readily appreciated from the following description of embodiments with reference to the drawings, in which.

Figure 1:
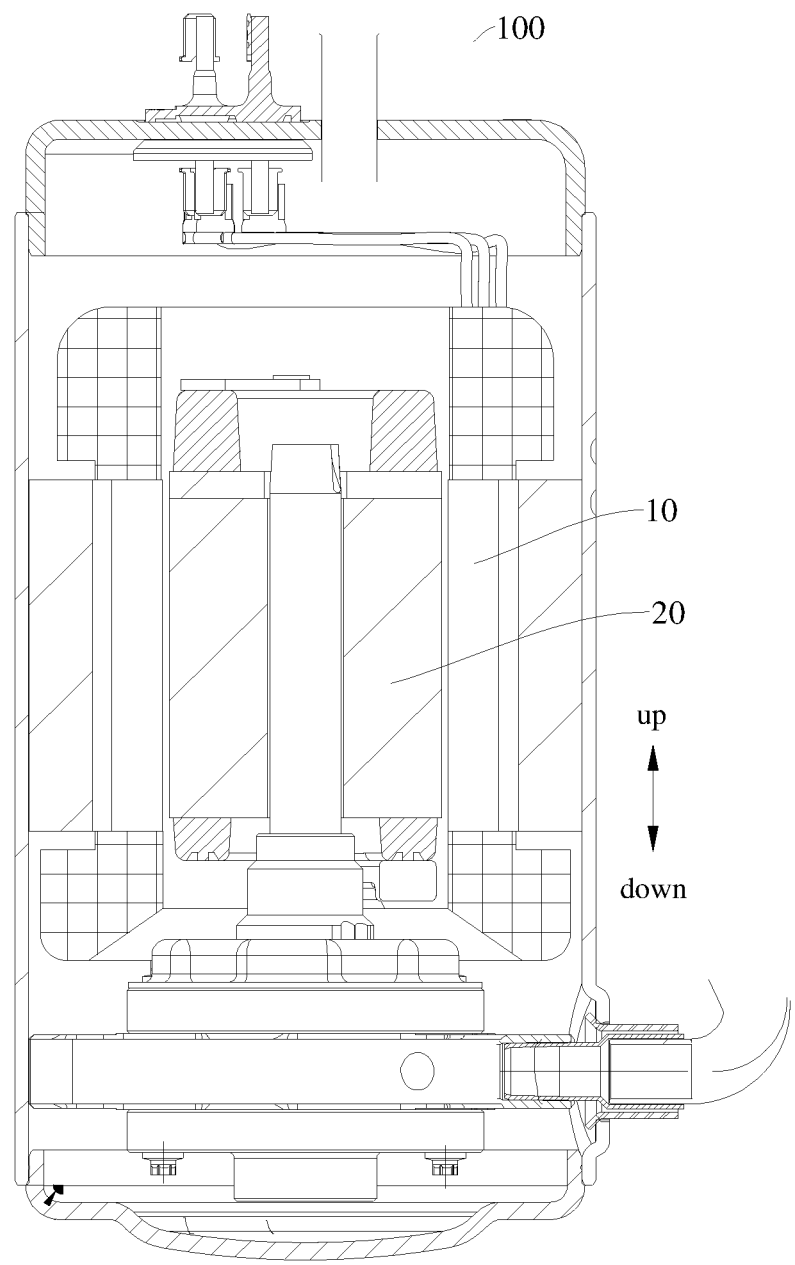
FIG. 1 is a schematic view of a rotary compressor according to an embodiment of the present disclosure.

The following is description of reference numerals of the figures:
- 100: compressor;
- 10: stator core; 10a: through-hole; 11: stator tooth;
- 20: rotor core; 21: rotor slot; 22: straight segment; 23: curved segment.

DETAILED DESCRIPTION OF EMBODIMENTS

Embodiments of the present disclosure will be described in detail below, and the examples of the embodiments will be illustrated in the drawings. The same or similar elements and the elements having same or similar functions are denoted by like reference numerals throughout the description. The embodiments described herein with reference to the drawings are illustrative and used to generally understand the present disclosure. The embodiments shall not be constructed to limit the present disclosure.

A motor for a rotary compressor 100 according to embodiments of a first aspect of the present disclosure will be described below with respect to FIGS. 1 and 2.

Figure 2:
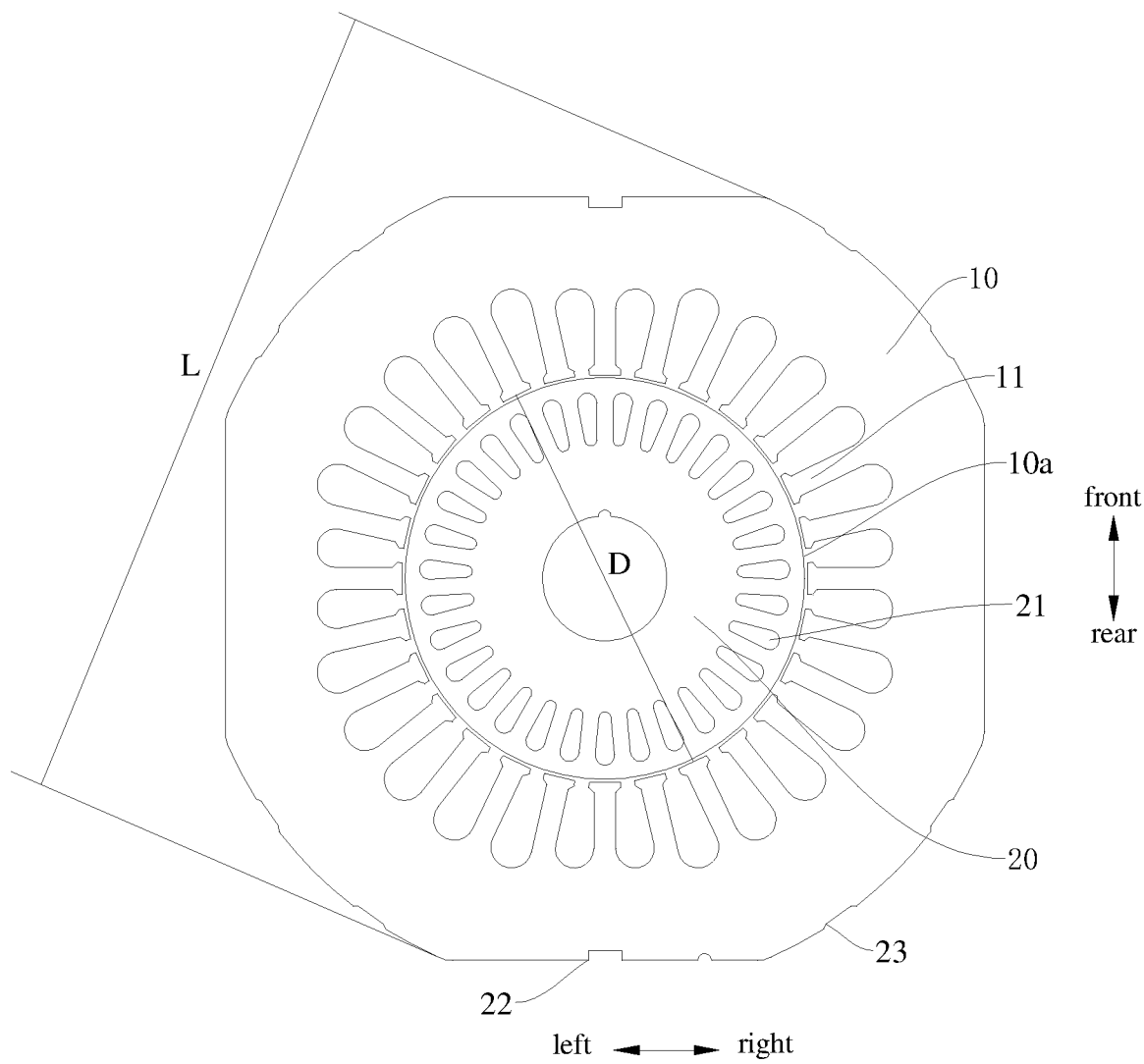
FIG. 2 is a schematic view of a stator core and a rotor core of a rotary compressor according to an embodiment of the present disclosure.

As shown in FIG. 2, the motor for the rotary compressor 100 according to the embodiments of the present disclosure includes a stator core 10 and a rotor core 20.

A through-hole 10a is provided in a center of the stator core 10. The through-hole 10a extends longitudinally through the stator core 10 from one longitudinal end of the stator core 10 to the other longitudinal end of the stator core 10. The stator core 10 is provided with a plurality of stator teeth 11 (which means two or more than two stator teeth 11), and the plurality of stator teeth 11 are spaced apart from each other circumferentially or in a peripheral direction of the stator core 10. As shown in FIG. 2, the stator teeth 11 are provided in an inner circular edge of the stator core 10, and the number of the stator teeth 11 is represented by M. According to this embodiment the number M is 28, that is to say, the stator core 10 is provided with twenty-eight stator teeth 11 in total.

The rotor core 20 is rotatably arranged in the through-hole 10a, that is, the rotor core 20 is located in the through-hole 10a of the stator core 10 and can rotate in the through-hole 10a. The rotor core 20 is provided with a plurality of rotor slots 21 (which means two or more than two rotor slots), and the plurality of rotor slots 21 are spaced apart from each other circumferentially or in the peripheral direction of the stator core 10 or the rotor core 20, in which N represents the number of rotor slots 21, and a relationship between M and N is 2≤N—M<6. That is to say, the number of rotor slots 21 minus the number of stator teeth 11 is greater than or equal to 2, and the number of rotor slots 21 minus the number of stator teeth 11 is less than or equal to 6. For example, a difference between the number of rotor slots 21 and the number of stator teeth 11 can be 2, 3, 4, 5 or 6.

For example, when M is 28, N can be 30, 31, 32, 33 or 34. The numbers of stator teeth 11 and rotor slots 21 can be set individually according to actual requirements.

Hence, by limiting the difference between the number of rotor slots and the number of stator teeth within the above range, and limiting a specific size ratio of the stator core to the rotor core 20, the stator core 10 and the rotor core 20 can have a good fit in size, thus improving the efficiency of the motor, and reducing the energy consumption of the motor.

As shown in FIG. 2, according to another optional embodiment of the present disclosure, a sectional area of the stator core 10 is S that refers to an area enclosed by a closed curve of an outer peripheral edge of the stator core 10; a distance between corresponding two endpoints of two curved segments 23 arranged oppositely is L; a distance between two farthest or radially outermost endpoints of the closed curve of the outer peripheral edge of the stator core 10 is denoted by L, in which $0.93 \leq (4*S)/(3.14/L^2) \leq 0.96$. The ratio herein is a ratio of an actual area of the stator core 10 to a circle area, and the so-called circle area is an area of a circle whose diameter is the distance between two farthest endpoints of the closed curve. For example, the ratio may be 0.93, 0.94, 0.945, 0.95 or 0.96, which can be selected according to actual requirements.

It can be understood that a refrigerant may flow along the outer peripheral edge of the stator core 10; when the ratio of the actual area of the stator core 10 to the circle area is smaller, the refrigerant flows less, and may take away less heat of the motor, resulting in poor heat dispersion of the motor; and when the ratio of the actual area of the stator core 10 to the circle area is larger, the energy consumption of the motor is larger, which is not conducive to energy conservation. Therefore, by limiting the ratio of the actual area of the stator core 10 to the circle area within the above range, it is possible to ensure that the refrigerant takes away heat, and at the same time reduce the energy consumption and improve the efficiency of the motor.

With the motor for the rotary compressor 100 according to the embodiments of the present disclosure, by limiting the number of stator teeth 11 of the stator core 10 of motor, and the relationship between the number of stator teeth 11 and the number of rotor slots 21 of the rotor core 20, under the fixed area ratio of the core, and on the premise of ensuring the performance of the motor, the efficiency of the motor can be improved, the loss of the motor can be reduced, and at the same time the electric energy loss can be reduced.

In order to facilitate the description of the stator teeth 11 of the stator core 10 and the rotor slots 21 of the rotor core 20, the term "peripheral direction" in the above embodiments simply refers to a peripheral direction in FIG. 2, which should not be construed to limit the present disclosure.

According to an embodiment of the present disclosure, the number M of the stator teeth is 28. That is, when the number of the stator teeth 11 is twenty-eight and the number of the rotor slots is thirty-two, the optimal fit between the stator teeth 11 and the rotor slots 21 can be achieved, and compared with other values of M and N, the efficiency of the motor may be optimized, and the energy consumption may be the lowest.

According to an embodiment of the present disclosure, a cross-section of the through-hole 10a of the stator core 10 is circular, that is, the through-hole 10a is an inner circular hole of the stator core 10. The outer peripheral edge of the stator core 10 forms a polygon that may be symmetrical around a center of the through-hole 10a. For example, the outer peripheral edge of the stator core 10 includes a plurality of straight segments 22 and a plurality of the curved segment 23. The plurality of the straight segments 22 (two or more than two straight segments) are disposed radially opposite to each other, and a plurality of the curved segments 23 (two or more than two curved segments) are disposed radially opposite to each other. As shown in FIG. 2, the straight segments 22 in pairs are arranged in a front-rear direction and a left-right direction of the stator core 10, which makes the structure of the stator core 10 symmetrical.

It is to be understood that the terms "front-rear" and "left-right" refer to the orientations or positions as shown in the drawings under discussion. The terms are only for convenience and simplification of description of the present disclosure, and do not indicate or imply that the stator core 10 referred to must have a particular orientation, and be constructed or operated in a particular orientation. Accordingly, these terms should not be constructed to limit the present disclosure.

As shown in FIG. 2, according to an optional embodiment of the present disclosure, each curved segments 23 is provided between and connected to two adjacent straight segments 22, and the curved segments 23 and the straight segments 22 are sequentially connected end-to-end to form a closed shape. That is to say, the outer peripheral edge of the stator core 10 forms a closed curve by connecting the straight segments 22 and the curved segment 23, and the closed curve defines the shape of the stator core 10 that exhibits symmetric aesthetics in structure.

Referring to FIG. 2, according to another optional embodiment of the present disclosure, a diameter of the through-hole 10a of the stator core 10 is represented by D, and a distance of corresponding two endpoints of two curved segments 23 disposed opposite to each other is represented by L. Herein, the distance of corresponding two endpoints is exemplarily illustrated by two opposite curved segments 23 on a diagonal, for example, a distance between a front-end endpoint of the curved segment 23 of a right-front part of the stator core 10 and a rear-end endpoint of the curved segment 23 of a left-rear part of the stator core 10. That is, a distance between the two radially farthest endpoints of the closed curved of the outer peripheral edge of the stator core 10 is represented by L, in which D/L≥0.52. It can be understood that a ratio of the diameter of the through-hole 10a to the distance between the two farthest endpoints of the outer peripheral edge of the stator core 10 is greater than or equal to 0.52, and for example, may be 0.52, 0.56, 0.58, 0.62, 0.66, 0.67, etc. The value of D/L can be set according to actual situations. Based on the value of D/L of stator core 10, the size of the stator teeth 11 of the stator core 10 and the outer peripheral edge of the stator core 10 can be determined, which makes the magnetic density distribution on the stator core 10 reasonable and thus the overall loss layout of the motor reasonable, reducing the loss and achieving the high efficiency of the motor.

It is to be understood that the orientations or positions indicated by the terms "left," "right," "front," and "rear" in the above embodiments refer to the orientations or positions shown in FIG. 2, only for convenience and simplification of description of the present disclosure, and do not indicate or imply that the stator core 10 referred to must have a particular orientation, and be constructed or operated in a particular orientation. Accordingly, these terms should not be constructed to limit the present disclosure.

According to another embodiment of the present disclosure, iron loss values of the stator core 10 and the rotor core 20 are represented by $P1_{15/50}$ and $P2_{15/50}$ respectively. $P1_{15/50}$ and $P2_{15/50}$ each represent an iron loss value per unit weight with a frequency of 50 Hz and a peak value of sinusoidal magnetic induction of 1.5T, and the so-called iron loss value refers to an energy loss value caused by an internal iron core during operation of a transformer, in which $P1_{15/50} \leq 10$ W/kg, and $P2_{15/50} \leq 10$ W/kg. For example, $P1_{15/50}$ may be 10 W/kg, 8 W/kg, 6 W/kg, 4 W/kg, 2 W/kg, etc., and likewise, $P2_{15/50}$ also may be 10 W/kg, 8 W/kg, 6 W/kg, 4 W/kg, 2 W/kg, etc. By limiting the iron loss values of the stator core 10 and the rotor core 20 within the above ranges, the losses of the stator core 10 and the rotor core 20 can be reduced, and the performance and efficiency of the motor can be improved.

According to another embodiment of the present disclosure, the stator core 10 includes a plurality of stacked stator punching sheets, the rotor core 20 includes a plurality of stacked rotor punching sheets, and thicknesses of each stator punching sheet and each rotor punching sheet are represented by h1 and h2 respectively, in which 0.35 mm≤$h_1$≤0.65 mm, and 0.35 mm≤$h_2$≤0.65 mm. For example, h1 may be 0.65 mm, 0.6 mm, 0.5 mm, 0.45 mm or 0.35 mm, and likewise, h2 also may be 0.65 mm, 0.6 mm, 0.5 mm, 0.45 mm or 0.35 mm By limiting the thicknesses of the stator punching sheet and the rotor punching sheet within the above ranges, the performance requirements of the stator core 10 and the rotor core 20 can be satisfied, and the stator core 10 and the rotor core 20 can be prevented from being oversized, so as to reduce the space occupied by the motor.

It should be noted that the stator core 10 and the rotor core 20 are both made of silicon-steel materials, and the stator punching sheets and the rotor punching sheets are silicon-steel sheets, thus improving the magnetic induction performance, reducing the hysteresis loss and the loss of the motor, and improving the performance of the motor.

Further, a magnetic induction value of the stator punching sheet is represented by $B_1$, and a magnetic induction value of the rotor punching sheet is represented by $B_2$, in which $B_1 \geq 1.7T$, and $B_2 \geq 1.7T$. For example, the magnetic induction value of the stator punching sheet may be 1.7T, 2.7T, 4.7T, 5.7T, etc., and likewise, the magnetic induction value of the rotor punching sheet may be 1.7T, 2.7T, 5.7T, 6.7T, etc. For example, the stator punching sheet can be selected according to actual requirements. By limiting the magnetic induction value of the stator punching sheet and the magnetic value of the rotor punching sheet within the above ranges, the magnetic induction density of the stator punching sheet and the rotor punching sheet can be improved, thus the magnetic induction performance of the stator core 10 and the rotor core 20 can be improved, and the motor efficiency can be enhanced.

As shown in FIG. 1, a compressor 100 according to embodiments of a second aspect of the present disclosure includes the motor for the rotary compressor 100 according to the above embodiments.

For the compressor 100 according to the embodiments of the present disclosure, by limiting the number of the stator teeth 11 of the stator core 10 of the motor, and the relationship between the number of the stator teeth 11 and the number of the rotor slots 21 of the rotor core 20, under the fixed area ratio of the core, and on the premise of ensuring the performance of the motor, the efficiency of the motor can be improved, the loss of the motor can be reduced, and at the same time the electric energy loss can be reduced, and the performance of the compressor 100 can be improved.

An air conditioner according to embodiments of a third aspect of the present disclosure includes the compressor 100 according to the above embodiments.

For the air conditioner according to the embodiment of the present disclosure, by limiting the number of the stator teeth 11 of the stator core 10 of the motor, and the relationship between the number of the stator teeth 11 and the number of the rotor slots 21 of the rotor core 20, under the fixed area ratio of the core, and on the premise of ensuring the performance of the motor, the efficiency of the motor can be improved, the loss of the motor can be reduced, at the same time the energy loss can be reduced, the performance of the compressor 100 can be enhanced, the energy consumption of the air conditioner can be reduced, and the cost can be lowered.

Other configurations and operations of the air conditioner, the compressor 100, and the motor for the rotary compressor 100 according to the embodiments of the present disclosure are known to those skilled in the art, and therefore will not be described in detail here.

In the description of this specification, reference to "an embodiment," "some embodiments," "an exemplary embodiment," "an example," "a specific example," or "some examples" means that a particular feature, structure, material, or characteristic described in connection with the embodiment or example is included in at least one embodiment or example of the present disclosure. In this specification, the appearances of the above terms are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it shall be appreciated by those skilled in the art that various changes, modifications, alternatives, and variations can be made in the embodiments without departing from principles and purposes of the present disclosure. The scope of the present disclosure is defined by claims or their equivalents.

What is claimed is:

1. A motor for a rotary compressor, comprising:
   a stator core having a through-hole extending longitudinally in a center of the stator core, and comprising a plurality of stator teeth spaced apart from each other in a peripheral direction of the stator core, a number of the stator teeth being M; and
   a rotor core rotatably arranged in the through-hole, and provided with a plurality of rotor slots spaced apart from each other along the peripheral direction, a number of the rotor slots being N, wherein $2 \leq N-M \leq 6$,
   wherein an area of a cross section of the stator core is S, and an outer peripheral edge of the cross section of the stator core comprises at least two curved segments radially opposite each other,
   wherein a distance between two radially outermost endpoints of the at least two curved segments radially opposite each other is L, and
   wherein the S and the L satisfy: $0.93 \leq (4*S)/(3.14*L^2) \leq 0.96$.

2. The motor according to claim 1, wherein the number M of the stator teeth is twenty-eight.

3. The motor according to claim 1, wherein a diameter of the through-hole is D, and the D and the L satisfy $D/L \geq 0.52$.

4. The motor according to claim 1, wherein:
   the stator core has an iron loss value per unit weight with a frequency of 50 Hz and a peak value of sinusoidal magnetic induction of 1.5T that is less than or equal to 10 W/kg; and
   the rotor core has an iron loss value per unit weight with a frequency of 50 Hz and a peak value of sinusoidal magnetic induction of 1.5T that is less than or equal to 10 W/kg.

5. The motor according to claim 1, wherein:
   a cross section of the through-hole is circular, and
   the outer peripheral edge of the cross section of the stator core further comprises at least two straight segments radially opposite each other.

6. The motor according to claim 5, wherein each one of the at least two curved segments is disposed between and connected to two adjacent straight segments, and the curved segments and the straight segments are sequentially connected end-to-end in a circumferential direction to form a closed shape.

7. The motor according to claim 1, wherein the stator core comprises a plurality of stacked stator punching sheets, the rotor core comprises a plurality of stacked rotor punching sheets, and a thickness of each stator punching sheet and a thickness of each rotor punching sheet are h1 and h2 respectively, wherein $0.35\ mm \leq h_1 \leq 0.65\ mm$, and $0.35\ mm \leq h_2 \leq 0.65\ mm$.

8. The motor according to claim 7, wherein a magnetic induction value of the stator punching sheet is B1, and a magnetic induction value of the rotor punching sheet is B2, wherein $B_1 \geq 1.7T$, and $B_2 \geq 1.7T$.

9. A compressor comprising the motor according to claim 1.

10. An air conditioner comprising the compressor according to claim 9.

* * * * *